(12) United States Patent
Inada

(10) Patent No.: US 6,295,478 B1
(45) Date of Patent: Sep. 25, 2001

(54) MANUFACTURING PROCESS CHANGE CONTROL APPARATUS AND MANUFACTURING PROCESS CHANGE CONTROL METHOD

(75) Inventor: Masayoshi Inada, Kumamoto (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/143,239

(22) Filed: Aug. 28, 1998

(30) Foreign Application Priority Data

Aug. 29, 1997 (JP) .................................. 9-235204

(51) Int. Cl.⁷ .................................................. G06F 19/00
(52) U.S. Cl. ........................... 700/51; 700/109; 702/84
(58) Field of Search ........................... 700/51, 105, 96, 700/97, 110, 109; 702/84

(56) References Cited

U.S. PATENT DOCUMENTS

| | | | |
|---|---|---|---|
| 5,339,257 | * 8/1994 | Layden et al. | 702/84 |
| 5,440,478 | * 8/1995 | Fisher et al. | 700/109 |
| 5,442,562 | * 8/1995 | Hopkins et al. | 700/108 |
| 5,586,066 | 12/1996 | White et al. | |
| 5,841,676 | * 11/1998 | Ali et al. | 702/84 |

FOREIGN PATENT DOCUMENTS

| | | |
|---|---|---|
| 64-64213 | 3/1989 | (JP) . |
| 7-219929 | 8/1995 | (JP) . |
| 8-202775 | 8/1996 | (JP) . |
| 9-50949 | 2/1997 | (JP) . |
| 95-25574 | 9/1995 | (KR) . |
| 97-60347 | 8/1997 | (KR) . |
| WO 98/18066 | 4/1998 | (WO) . |

OTHER PUBLICATIONS

Japanese Office Action dated Apr. 6, 1999 (and partial translation).
British Search Report dated Jan. 29, 1999.
Korean Office Action dated Aug. 26, 2000, with Japanese translation, and partial English translation thereof.

\* cited by examiner

*Primary Examiner*—William Grant
*Assistant Examiner*—Edward F. Gain, Jr.
(74) *Attorney, Agent, or Firm*—McGinn & Gibb, PLLC

(57) ABSTRACT

A process change control apparatus that performs a control function based on information from a manufacturing process is provided in a manufacturing process control system. The change control apparatus includes a recorder which records a change item for which a manufacturing process change control is to be performed, information required for a making judgment, a judgment method, an for extracting date from a manufacturing process and recording required information before and after a change point for each change item recorded in the, a statistical comparison judging device which performs a statistical comparison judgment of the information extracted by the information extractor before and after the change point for each change item, and an output device which outputs the result of the comparison judging device.

12 Claims, 4 Drawing Sheets

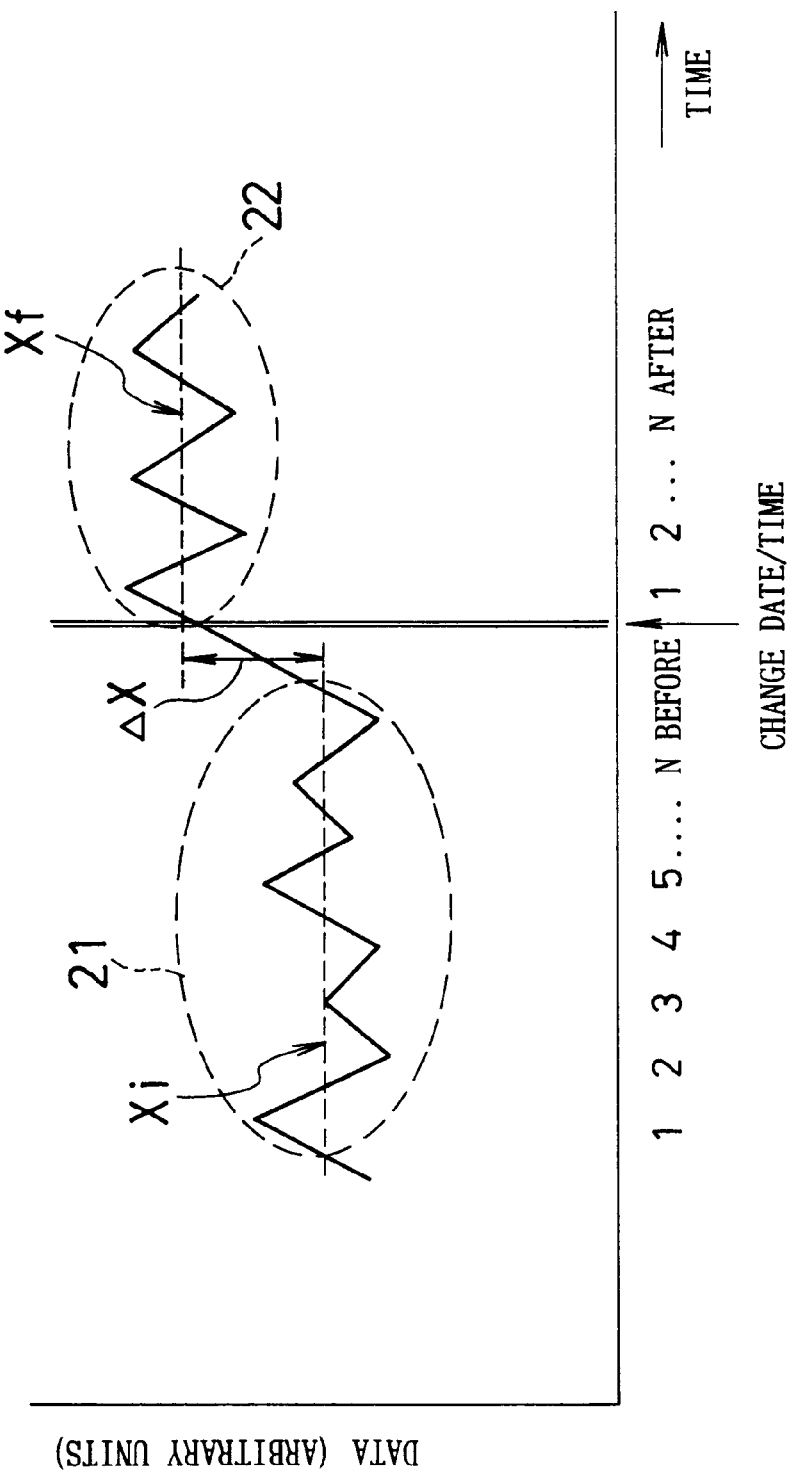

MANUFACTURING PROCESS CHANGE CONTROL APPARATUS AND MANUFACTURING PROCESS CHANGE CONTROL METHOD

BACKGROUND OF THE INVENTION

1. Field of the Invention

The present invention relates to a manufacturing process change control apparatus and a manufacturing process change control method, and more specifically to a manufacturing process change control apparatus and manufacturing process change control method that are suitable for use in a manufacturing control system for the manufacturing processes of semiconductor devices.

2. Description of Related Art

In the past, control of manufacturing processes in a factory was generally done in real time, using control diagrams and the like, and it was necessary to quickly determine the cause in the case in which an abnormality was discovered in any of the trends collected for the controlled processes.

However, in a factory having many processes and manufacturing processes in which the same equipment is used a large number of times, such as in a semiconductor factory, the causes of disturbance to the manufacturing processes interact in a complex manner, so that there are many cases in which a large amount of time is expended in discovering the basic cause.

In particular with regard to such changed items as equipment maintenance, which is performed in asynchronously with respect to manufacturing, it is extremely difficult to control the influence that each change item has on the manufacturing process.

Because of the above-noted situation, in many manufacturing factories, such as semiconductor factories, there are efforts being made to automate the manufacturing processes and the system of managing the manufacturing processes, for the purpose of not only improving quality and reliability, but also of increasing the usage efficiency of manufacturing equipment and lowering the manufacturing cost.

For example, in the case of controlling the quality of a product, it is necessary to control all of the manufacturing processes.

In particular with regard to a semiconductor manufacturing factory, because of the large number of and complexity of the manufacturing processes, the observation of the quality of each and every process requires a large amount of time, this imposing limits to control performed by humans.

Additionally, because of the complex interrelationships between processes, it is difficult to discover the cause of a disturbance or abnormality in manufacturing data by merely managing each individual process, this approach necessarily becoming an insufficient one.

Because of this situation, there has been an attempt to configure a manufacturing factory to enable automated control and improvement of the overall manufacturing process, one example with regard to process control system aimed at automation of quality control in a semiconductor manufacturing factory being a manufacturing process quality problem handling system that is disclosed, for example, in the Japanese Unexamined Patent Publication (KOKAI) No. 8-202775.

In this system, each of the manufacturing data that are collected for one and the same control unit by a process data collection apparatus is compared by means of a collected data checking apparatus with respect to control values and control upper limits and control lower limits which are established in accordance with the product specifications, a comparison being made to determine whether or not values are within a set control range, and if this range is exceeded, an alarm is issued, thereby notifying a worker of the abnormality.

Simultaneously with the above, sampling is used to calculate average values and dispersions, these trends in collected data being checked, this actual data being used as the basis for automatic resetting of more severe control ranges, thereby performing strict quality control so as to maintain product quality at a high level, this being proposed as one method of performing strict control of a general process control system and quality.

In the above-described manufacturing processing quality abnormality handling system, the automatic specification judgment for each process is basically only making a judgment as the good or bad quality of the results from the immediately previous manufacturing process, so that even if an alarm is issued, this is only notification that some type of abnormality has occurred in a manufacturing process, that is, that a process exceeds a control limit, and this does not provide notification of the location in the manufacturing process or the cause of the abnormality.

Therefore, although it is possible to use this alarm to stop manufacturing and minimize the abnormal products that occur, time is required to actually discover the cause of the abnormality, during which, because the manufacturing process is stopped, a great loss is incurred in manufacturing.

The reason the above-noted problem occurs is because the information with regard to the cause of the abnormality is ignored.

In general, causes of such abnormalities are various, and can be envisioned as including suddenly occurring equipment problems, human errors such as improper settings of conditions and improper maintenance, and variations between lots of raw materials or changes in quality of purchased materials.

Of the above, while it is impossible to avoid suddenly occurring equipment problems with a conventional control system, there is generally some information with regard to the other problems, and the reason that manufacturing process quality problem handling systems of the past could not teach of the cause of an abnormality was that absolutely no consideration was given to the relationship to this information.

The present invention was made in view of the above-described situation, and has an object the provision of a manufacturing process change control apparatus and a manufacturing process change control method which, when a change point occurs in a manufacturing process, performs a statistical comparison judgment between the information in the manufacturing process for each changed item after the change point with the same information before the change point, thereby providing a direct and quick grasp of the cause of the abnormality in manufacturing data and enabling quick corrective action.

SUMMARY OF THE INVENTION

To achieve the above-noted object, the present invention provides a manufacturing process change control apparatus and manufacturing process change control method as described below.

Specifically, a manufacturing process change control apparatus according to the present invention, is an apparatus provided in a manufacturing process control system and which performs manufacturing process change control based on information from the manufacturing process, this apparatus having a recording unit which records a plurality of change items for which manufacturing process change control is to be performed, information necessary for a judgment, and a judgment method, an information extraction/storage unit which, before and after each one of the change points for each change item that is stored in the above-noted recording unit, extracts required information from the manufacturing process and stores this information, a comparison judging unit which performs a statistical comparison judgment of information extracted by the above-noted information extraction/storage unit before and after one of the change points for each change item, and an output unit which outputs the comparison judgment results of the comparison judging unit.

In a manufacturing process change control apparatus of the present invention, the output unit is provided with a display unit which displays the results of the comparison judging unit and an alarm generation unit which issues an alarm in the case in which the result of the comparison judging unit is exceeds a specification value, or both such unit.

In a manufacturing process change control apparatus of the present invention, the comparison judging unit performs a check for a significant difference in the information before and after a change point for each change item.

In a manufacturing process change control apparatus of the present invention, the process control system is provided with a process sequence control unit, a process condition control unit, a process specification control unit, an equipment control unit, a product history control unit, an equipment history control means, and a process quality control unit.

On the other hand, a manufacturing process change control method of the present invention, is a manufacturing process change control method based on information from manufacturing processes, whereby change items for which manufacturing process change control is to be performed, information required for a judgment, and a judgment method are recorded, information from for each one of the change items from the manufacturing process before and after the change point being extracted and stored, a statistical comparison judgment being made with regard to information before and after the change point for each of the extracted change items, and the results of this comparison judgment being output.

In a manufacturing process change control apparatus according to the present invention, in the overall manufacturing process, the recording unit records the change items for which manufacturing process change control is to be performed, information that is required for a comparison judgment, and a comparison method, the information extraction/storage unit extracting and storing required information from the manufacturing process before and after the change points for each of the change items that is in the recording unit.

This extracted information is subjected to a statistical comparison judgment, by the comparison judging unit, for before and after each of the change points for each change item.

Finally, the output unit outputs the comparison judgment results of the comparison judging unit.

By means of these comparison judgment results, a worker makes a judgment as to whether or not action is to be taken with respect to the change point, thereby enabling quick action and improvement of the manufacturing process.

Additionally, in order to enable to clearly establish whether the change point was an improvement or a worsening of the manufacturing process, it is possible to efficiently collect data for the purpose of analysis of the factors affecting the manufacturing process.

A significant difference test is preferred as a method of performing the above-noted statistical comparison judgment. It is desirable that the method of performing this significant difference test be recorded in the recording unit beforehand.

If a display unit and an alarm generation unit or both are provided in the output unit, it is possible provide an immediate display for the comparison judgment results, and by issuing an alarm in the case in which the comparison judgment results indicate that a specification value has been exceeded, this can provide a quick notification of the occurrence of an abnormality.

In a manufacturing process change control method according to the present invention, the change items for which manufacturing process control is to be performed, information required for a judgment, and a judgment method are recorded, information required before and after the change point for each recorded item being extracted from the information of previous and subsequent manufacturing processes and stored, a statistical comparison being performed of the information before and after the change point for each of the extracted change items, and the results of this comparison judgment being output, thereby enabling quick action and improvement measures to be taken with regard to the manufacturing process.

In addition, it is possible to efficiently collect information for the purpose of analysis of the factors affecting the manufacturing process, this enabling a clear identification of the influence of the process with a change point.

Further in the present invention, the manufacturing process change control method is further specified in such as way that the method comprising steps of, recording a plurality of change items for each of which manufacturing process change control is to be performed, information required for a judgment, and a judgment method, extracting required information before and after a change point for each one of the stored change items, from the manufacturing process and storaging same in a memory unit, performing a statistical comparison judgment of the extracted information before and after the change point for each change item, and outputting of a result of the comparison judgment.

A plurality of change items are predeterminedly established for each one of process changing operations which being mandatatorily performed so as to implementing the manufacturing process change control.

Moreover the manufacturing process change control method is further characterized in that when at least one of manufacturing conditions of the manufacturing process had been changed, a predetermined plurality of information samples concerning one of the change items related to the change in such condition and before and after the change point, are extracted from the memory unit, respectively, and one information group consisting the extracted information samples obtained before the change point being compared with another information group consisting the extracted information samples obtained after the change point.

Note that in the present invention, there are many number of the change items exist in the manufacturing process, for example, for making a semiconductor substrate and the change items include, for example, a change of material to be used, a change of a filter, a change of gas flow-rate or the like and each one of these change items has a special relationship to the fact that some process condition of a part of or parts of such manufacturing process is mandatorily changed.

Generally, when such condition had been changed, a lots of other factors (items) would also be affected by this change the process condition resulting in the characteristic of the product sometimes being significantly changed.

Therefore, the characteristic of the product should be observed from multiple points of views so as to check how the characteristic of the product had been changed and what is the good way to restore the varied characteristic of the product to the predetermined characteristic.

Accordingly, in the present invention, for example, when a filter has been changed, a plurality of change items to be monitored, such as flow rate of gas, pressure thereof, concentration of the gas, characteristic of the product and so on are predeterminedly established.

Accordingly, when the filter should be exchanged, the above-mentioned change items will be selected, for example, and information concerning thereof are extracted from the above-mentioned recording unit.

BRIEF DESCRIPTION OF THE DRAWINGS

FIG. 4 is a time-variation graph of comparison process data, this showing an example of a testing method in an embodiment of a change control apparatus according to the present invention.

DETAILED DESCRIPTION OF THE PREFERRED EMBODIMENTS

Figure 1:
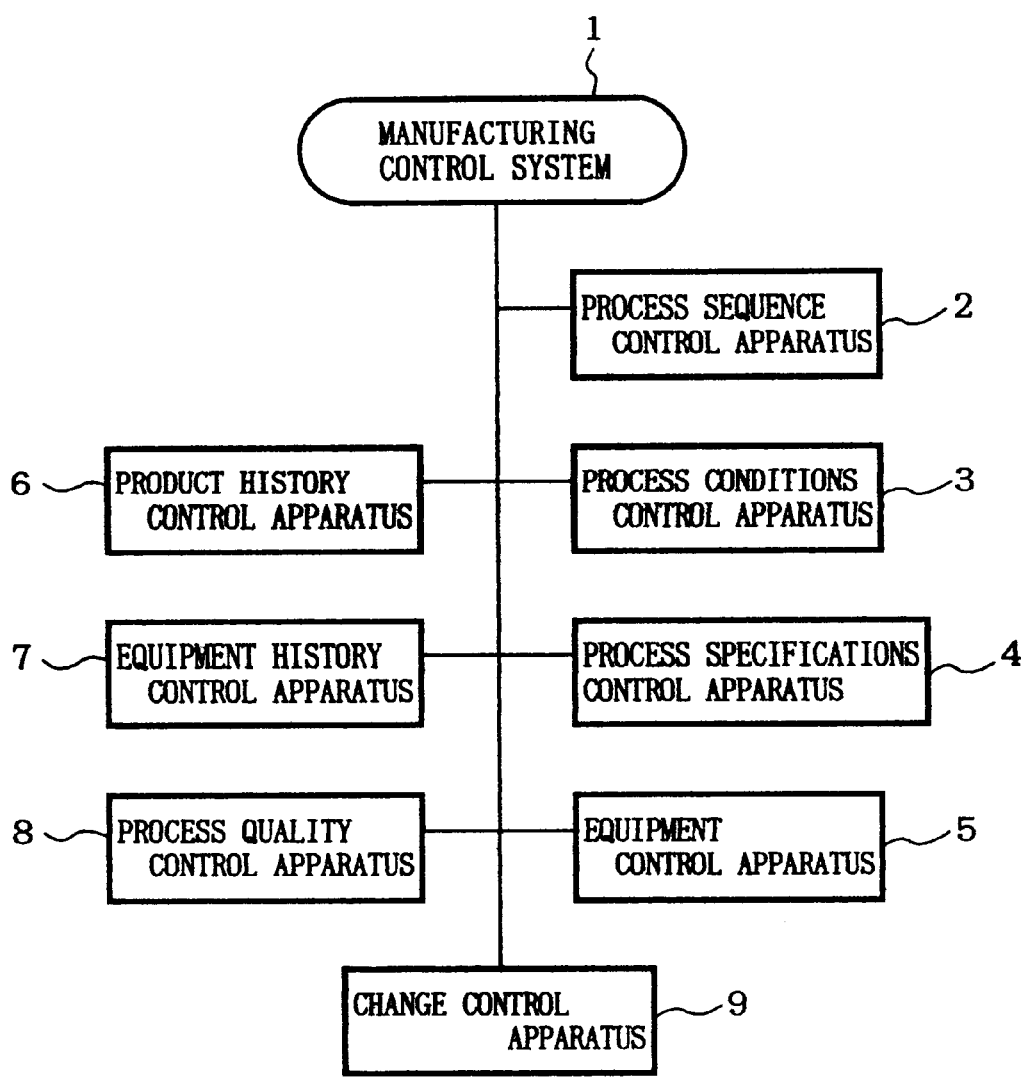
FIG. 1 is a block diagram which shows a manufacturing control system which is provided with a manufacturing process change control apparatus according to an embodiment of the present invention.

An embodiment of a manufacturing process change control apparatus and manufacturing process change control method according to the present invention, with reference being made to the relevant accompanying drawings FIG. 1 is a block diagram which shows a manufacturing control system which is provided with an embodiment of a manufacturing process change control apparatus according to the present invention.

In this drawing, the reference numeral 1 denotes a manufacturing control system, this being formed by a process sequence control apparatus (process sequence control means) 2, a process condition control apparatus (process condition control means) 3, a process specifications control apparatus (process specifications control means) 4, an equipment control apparatus (equipment control means) 5, a product history control apparatus (product history control means) 6, an equipment history control apparatus (equipment history control means) 7, a process quality control apparatus (process quality control means) 8, and a change control apparatus (manufacturing process change control apparatus) 9, these control apparatuses 2 through 9 being capable of mutual passing of data therebetween.

Before starting a manufacturing process, a worker records the required information in the control apparatuses 2 through 9.

The process sequence control apparatus 2 controls the process sequence for each manufacturing process, and the process conditions control apparatus 3 controls the various conditions for each process for each product.

The process specifications control apparatus 4 controls the specification values of a controlled process for each manufacturing process, makes an evaluation as to whether or not data collected in the manufacturing process is within specifications and, if it is within specifications, continues the manufacture of the production lot.

If the specifications have been exceeded, however, the process specifications control apparatus 4 stops the manufacturing of the production lot. The equipment control apparatus 5 controls each individual piece of equipment that is related to manufacturing, and controls the formatting of operational information and on-line collected data for each individual piece of equipment.

The product history control apparatus 6 performs recording control of production information for each manufacturing process and for each production lot.

The equipment history control apparatus 7 performs recording control of operating information of each individual piece of equipment of each type which is reported from each equipment.

The process quality control apparatus 8 performs collection and layering of various data that is collected by the product history control apparatus 6 and the equipment history control apparatus 7, performs statistical processing thereof in accordance with a specified quality control method and, if the processing results are within control specifications, continues the manufacturing of that production lot.

If the processing results are outside control specifications, however, the process quality control apparatus 8 judges that an abnormality has occurred in that production lot, and issues an alarm.

Figure 2:
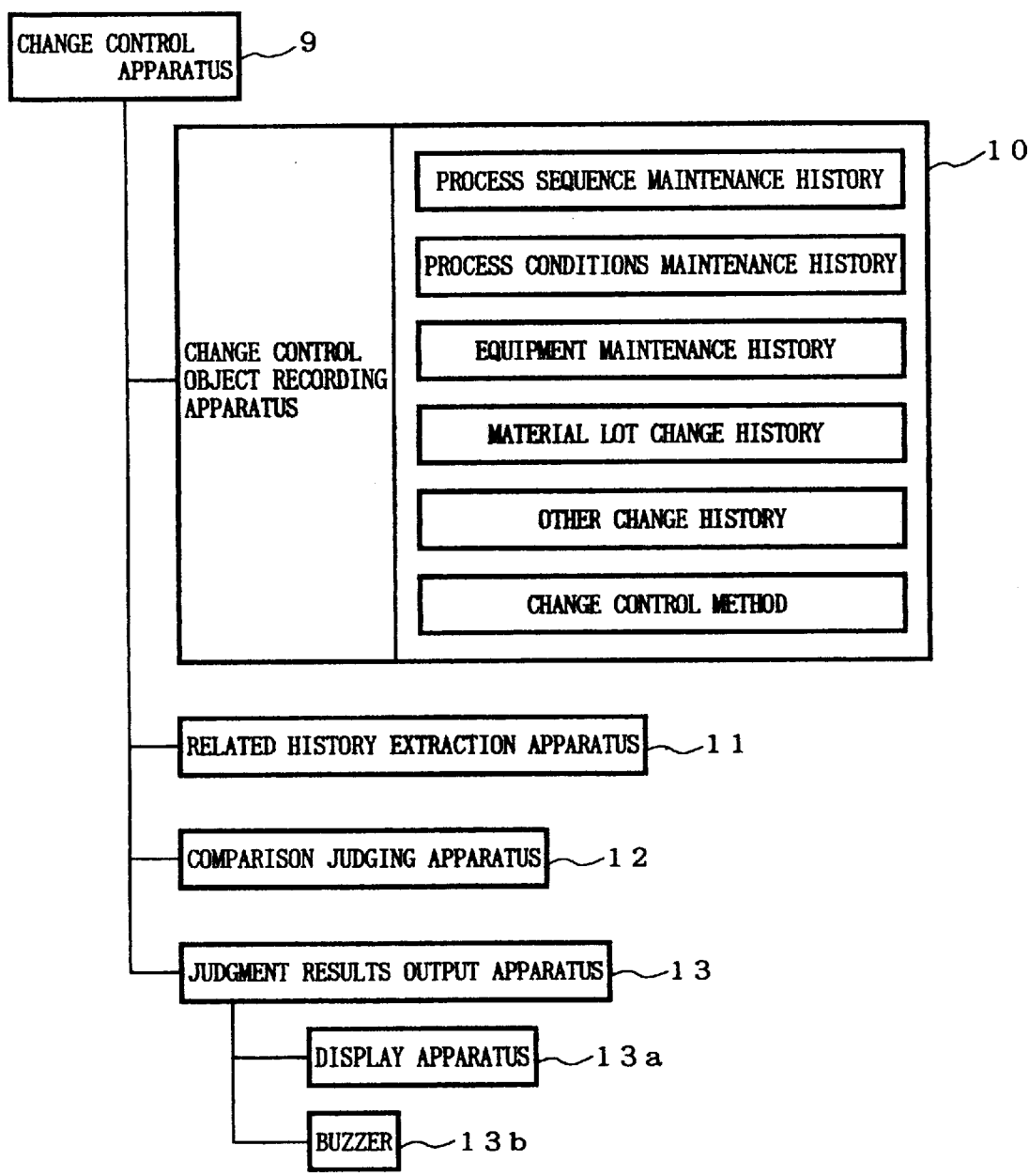
FIG. 2 is a block diagram which shows the detailed configuration of an embodiment of a manufacturing process control apparatus according to the present invention.

FIG. 2 is a block diagram which shows the detailed configuration of the change control apparatus 9, this apparatus performing extraction of required data from the various data that are collected by the product history control apparatus 6 and the equipment history control apparatus 7 and also performing change control.

This change control apparatus 9 is formed by a change control object recording apparatus (recording means) 10, a related history extraction apparatus (information extraction/recording means) 11, a comparison judging apparatus (comparison judging means) 12, and a judgment results output apparatus (output means) 13 which has a display apparatus (display means) 13a and a buzzer (alarm generation means) 13b.

The change control object recording apparatus 10 records a plurality of change items for which manufacturing process change control is to be performed, information required for a judgment, and a judgment method and records, for example, a process sequence maintenance history, a process conditions maintenance history, an equipment maintenance history, a material lot change history, other change histories, and a change control method or the like, and specifies items that are required from the maintenance histories of various manufacturing parameters, the change date and time, compared process data name, test method, number of tests, test time and other information required for testing (information required to make a judgment) for each of the items being stored.

The related history extraction apparatus (information extraction means) 11 collects from the product history control apparatus 6 and the equipment history control apparatus 7 data (required information) that is specified by the change control object recording apparatus 10.

The comparison judging apparatus 12 performs a statistical comparison judgment of various information before and after the change point, which is extracted by the related history extraction apparatus 11, a significant difference test being performed in accordance with a test method specified by the change control object recording apparatus 10 and, in the case in which a significant difference is judged, sends an alarm to the comparison results output apparatus 13 as the result of the test.

At the judgment results output apparatus 13, the alarm which and test result which have been sent thereto are output to the display apparatus 13a and the alarm sound is generated by the buzzer 13b, thereby making notification of the test result.

If the result of the significant difference test is that there is no significant difference, however, only the test result is sent to the judgment results output apparatus 13, the judgment results output apparatus 13 outputting this test result to the display apparatus 13a.

Figure 3:
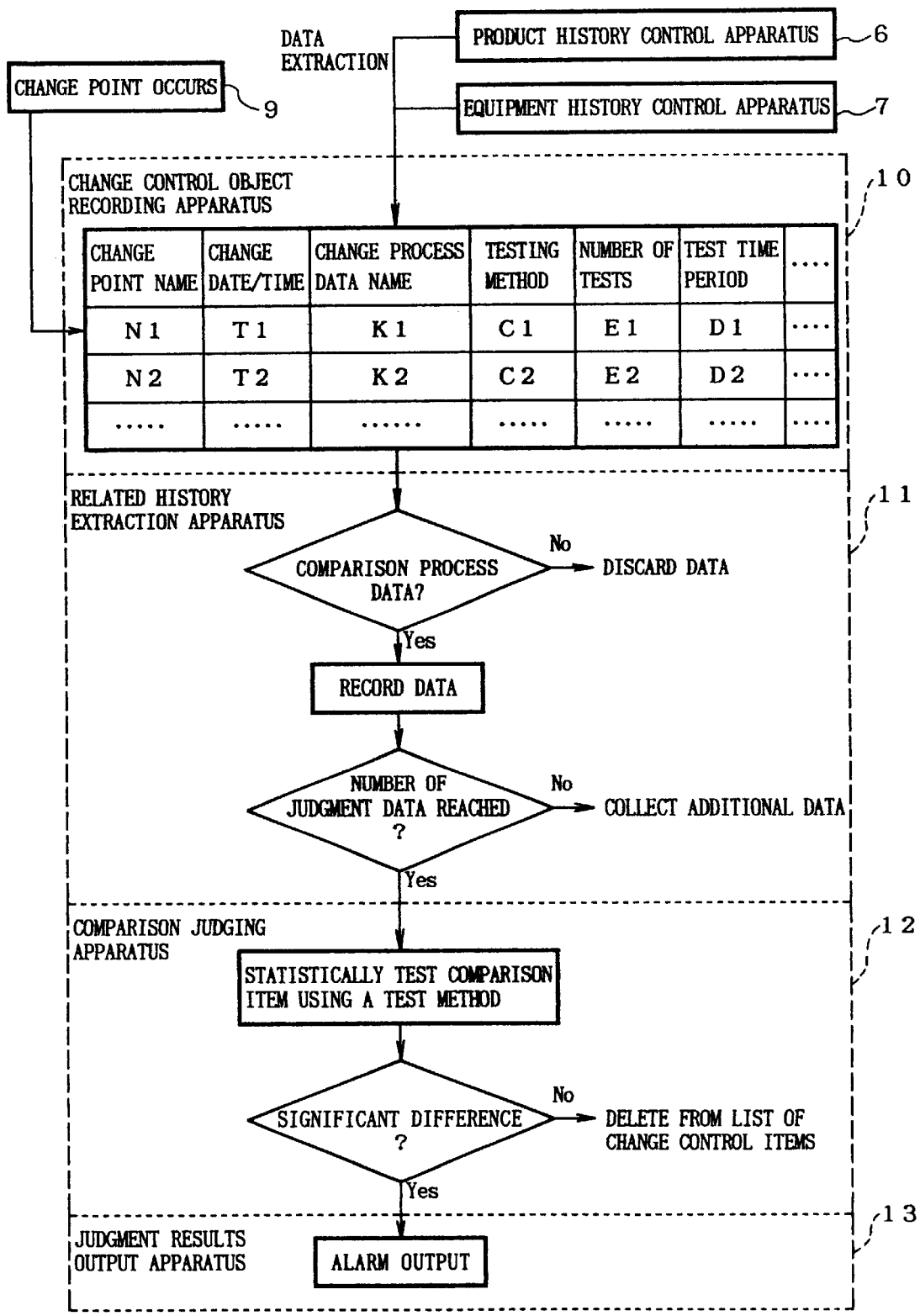
FIG. 3 is a flowchart which shows an example of the change control method according to an embodiment of the change control apparatus according to the present invention.

FIG. 3 is a flowchart which shows an example of the change control method according to the change control apparatus 9.

Of the production activities that are carried out asynchronously with respect to the manufacturing processes at a manufacturing factory (such as changes in manufacturing conditions and equipment maintenance), change points that are thought to be required for change control are recorded in the change control object recording apparatus 10.

The contents that are recorded are items such as change point name, change point date and time, compared process data name, test method, number of tests, and test time period.

Note that the compared process data name as used in this embodiment of the present invention denotes the data or information concerning characteristic of the product, pressure information, gas flow rate information or the like related to one of the change items corresponding to the conditional change in the manufacturing process, for example, the filter change or the like.

The related history extraction apparatus 11 extracts and records, from the product history control apparatus 6 and the equipment history control apparatus 7, the comparison process data for either the predetermined number of tests or the predetermined test time period before and after the change date and time recorded in the change control object recording apparatus 10, whichever is first.

At this point, a judgment is made as to whether or not the extracted data is comparison process data and, it if it comparison process data, the data is recorded, but if it is not comparison process data this extracted data is discarded.

Then, a judgment is made as to whether the number of data has reached the judgment quantity.

If the judgment quantity of data has not been reached, more comparison process data is collected, but if the number has been reached the flow proceeds to the next step.

On the other hand, instead of correcting such information samples up to the predetermined number, the comparison judgment can be performed after when a predetermined inspection time has passed.

The comparison judging apparatus 12 performs a statistical significant difference test according to a test method that is recorded in the change control object recording apparatus 10 for before and after the date and time of the change.

If there is a significant difference, the change point name and test results are sent to the judgment results output apparatus 13, but if there is no significant difference, this change point name is removed from the list of changes to be processed.

The judgment results output apparatus 13 outputs the contents of the testing results and the alarm to the display apparatus 13a, and causes the buzzer 13b to generate an alarm sound.

By means of the display apparatus 13a and the buzzer 13b, the worker is informed that there was a significant difference before and after the change date and time, and can investigate the cause of this significant difference, and use this information for the purpose of making production improvements.

FIG. 4 is a graph which shows the time variations of comparison process data, this illustrating an example of a testing method in the change control apparatus 9.

In this drawing, the reference numeral 21 denotes the time-varying data of one change items before the process condition has been changed, 22 is the time-varying data of the same change items after the process condition has been changed, Xi is the average value before the change, Xf is the average value after the change, and ΔX is the difference between the average before the change Xi and the average after the change Xf.

The comparison judging apparatus 12 performs statistical processing of the data before and after the change date and time, with respect to the comparison process data that is specified by the change control object recording apparatus 10.

As an example, consider a comparison using the difference of the average values. The difference ΔX between the average value Xi of the time-varying data 21 before the change an the average value Xf of the time-varying data 22 after the change is calculated.

If this difference ΔX is greater than XO, which is a value of the testing method that is specified by the change control object recording apparatus 10, the judgment is made that there is a significant difference, whereupon an alarm is output to the judgment results output apparatus 13.

It is possible to use a variety of testing methods instead of the average values used in this example.

In this embodiment of the present invention, a list of items to change is generated beforehand, automatic collection being done of manufacturing process data related to this items, and an automatic test being performed to determine whether or not there was a difference before and after the change.

By doing this, in a case in which a significant difference is judged as a result of the test, an alarm is issued to make a notification that there has been a change in the manufacturing process, simultaneously with which it is possible to directly indicate the cause of the change, thereby shortening the time required to achieve an improvement.

According to a manufacturing process change control apparatus of the present invention as described above, because a change control apparatus is provided with a recording means that records a change item for which manufacturing process change control is to be performed, information required for a judgment, and a judgment method, an information extraction/recording means which before and after a change point for each change item that is stored in the recording means, extracts required information from the manufacturing process and stores this information, a comparison judging means which performs a statistical comparison judgment of information extracted by the above-noted information extraction/storage means before and after the change point for each change item, and an output means which outputs the comparison judgment results of the comparison judging means, these comparison results can be used to make a quick judgment as to whether or not to take corrective action with respect to a change point, thereby enabling quick action and improvement with respect to the manufacturing process.

Because it is possible to clearly determine whether the change point was an improvement to the manufacturing process or a worsening thereof, it is possible to efficiently collect information for the purpose of analyzing factors affecting the manufacturing process.

Additionally, if a display means or an alarm generation means or both are provided in the output means, it is possible to immediately know the comparison judgment results, and in the case in which the comparison judgment results indicate a condition outside a specification, an alarm is generated, making it possible to quickly learn of the occurrence of an abnormality.

According to a manufacturing process change control method of the present invention, because a change item for which manufacturing process change control is to be performed, information required for a judgment, and a judgment method are recorded, required information being extracted from the manufacturing process for before and after a change point for each item that is recorded, a statistical comparison judgement being performed of information extracted before and after the change point for each change item, and the results of this comparison judgement being output, it is possible to take quick action to correct and improve the manufacturing process. Additionally, because the influence of the change point on the manufacturing process is clearly identified, it is possible to efficiently collect information for the purpose of analyzing the factors affecting the manufacturing process.

What is claimed is:

1. A manufacturing process change control apparatus that is provided in a manufacturing control system for a manufacturing process, said manufacturing process change control apparatus performing a control change in said manufacturing process with respect to information generated from said manufacturing process, said manufacturing process change control apparatus comprising:

means for recording a plurality of change items for which manufacturing process change control is to be performed, information required for a judgment, and a judgment method;

information extracting and recording means for extracting said required information after a change point for each of said change items stored in said recording means, said required information being extracted from information generated from said manufacturing process, and for recording said required information therein;

comparison judgment means for statistically performing a comparison judgment of said required information obtained from a period before and a period after said change point for each change item and extracted by said information extracting and recording means; and output means for outputting a comparison judgment result of said comparison judging means, wherein said recording means records a process sequence maintenance history, a process conditions maintenance history, an equipment maintenance history, and a material lot change history, and wherein a plurality of predetermined data items are selected for recording comprising the maintenance histories of selected manufacturing parameters, the change date and time, the compared process data name, the test method, the number of tests, and the test time of each item being stored.

2. The manufacturing process change control apparatus according to claim 1, wherein said output means has at least one of a group consisting of a display means for displaying said comparison judgment result and an alarm generation means for generating an alarm when said comparison judgment result indicates an out-of-predetermined specification condition.

3. The manufacturing process change control apparatus according to claim 1, wherein said comparison judging means performs a significant difference test with respect to said required information obtained from said period before and said period after change point for each said change item.

4. The manufacturing process change control apparatus according to claim 1, wherein said manufacturing control system is provided with process sequence control means, process conditions control means, process specifications control means, equipment control means, product history control means, equipment history control means, and product quality control means.

5. A manufacturing process change control method based on information from a manufacturing process, said method comprising:

recording a plurality of change items for each of which a manufacturing process change control is to be performed, information required for a judgment, and a judgment method;

extracting required information before and after a change point for each one of said stored change items from said manufacturing process and storing said extracted information in a memory means;

performing a statistical comparison judgment of said extracted information before and after said change point for each change item; and outputting a result of said comparison judgment, wherein said recording comprises recording a process sequence maintenance history, a process conditions maintenance history, an equipment maintenance history, and a material lot change history, and wherein a plurality of predetermined data items are selected for recording comprising the maintenance histories of selected manufacturing parameters, the change date and time, the compared process data name, the test method, the number of tests, and the test time of each item being stored.

6. The manufacturing process change control method according to claim 5, wherein said plurality of change items are predeterminedly established for each one of a plurality of process changing operations being mandatorily performed implementing said manufacturing process change control.

7. The manufacturing process change control method according to claim 5, wherein when at least one of a plurality of manufacturing conditions of said manufacturing process changes, a predetermined plurality of information samples concerning one of said plurality of change items related to said change in said at least one manufacturing condition and before and after said change point, are extracted from said memory, respectively, and wherein one information group comprising said extracted information samples obtained before said change point are compared with another information group comprising said extracted information samples obtained after said change point.

8. A manufacturing process change control apparatus, said apparatus comprising:
   a recorder for recording a plurality of change items for which a process change is to be performed, information required from a manufacturing process for making a comparison judgment, and a comparison method;
   an information extracting and storing device for extracting and storing said required information from a period before said process change and from a period after said process change;
   a comparison judgment controller for performing a statistical comparison judgment of said required information obtained from said period before and from said period after said process change for each of said plurality of change items and extracted by said information extracting and storing device; and
   an output device for outputting a judgment result of said comparison judgment controller,
   wherein said recorder records a process sequence maintenance history, a process conditions maintenance history, an equipment maintenance history, and a material lot change history, and
   wherein a plurality of predetermined data items are selected for recording comprising the maintenance histories of selected manufacturing parameters, the change date and time, the compared process data name, the test method, the number of tests, and the test time of each item being stored.

9. The manufacturing process change control apparatus, as claimed in claim 8, wherein said statistical comparison judgment is a significant difference test method, said method stored in said recorder prior to said process change being performed.

10. The manufacturing process change control apparatus, as claimed in claim 8, wherein an output device comprises a display apparatus.

11. The manufacturing process change control apparatus, as claimed in claim 8, wherein an output device comprises an alarm sound.

12. The manufacturing process change control apparatus, as claimed in claim 8, wherein a list of said plurality of change items is generated before said process change is performed,
   wherein automatic collection of manufacturing data related to said plurality of change items is performed,
   wherein an automatic test is performed by said comparison judgment controller to determine if a significant difference has occurred with reference to data before and after a change item is performed, and
   wherein only change items for which said comparison judgment controller has determined a significant difference has occurred are output.

* * * * *